United States Patent
Hansen et al.

(10) Patent No.: US 11,782,968 B2
(45) Date of Patent: Oct. 10, 2023

(54) SYSTEMS AND METHODS FOR PROVIDING MEDIA RECOMMENDATIONS USING CONTEXTUAL AND SEQUENTIAL USER EMBEDDINGS

(71) Applicant: Spotify AB, Stockholm (SE)

(72) Inventors: Casper Hansen, Copenhagen (DK); Christian Hansen, Copenhagen (DK); Lucas Maystre, London (GB); Rishabh Mehrotra, London (GB); Brian Christian Peter Brost, New York City, NY (US); Federico Tomasi, London (GB); Mounia Lalmas-Roelleke, Saffron Walden (GB)

(73) Assignee: Spotify AB, Stockholm (SE)

( * ) Notice: Subject to any disclaimer, the term of this patent is extended or adjusted under 35 U.S.C. 154(b) by 427 days.

(21) Appl. No.: 16/789,214

(22) Filed: Feb. 12, 2020

(65) Prior Publication Data
US 2021/0248173 A1   Aug. 12, 2021

(51) Int. Cl.
*G06F 16/435* (2019.01)
*G06F 16/438* (2019.01)
(Continued)

(52) U.S. Cl.
CPC ...... *G06F 16/435* (2019.01); *G06F 16/24575* (2019.01); *G06F 16/41* (2019.01);
(Continued)

(58) Field of Classification Search
CPC ............... G06F 16/435; G06F 16/438; G06F 16/24575; G06F 16/41
(Continued)

(56) References Cited

U.S. PATENT DOCUMENTS 9,712,587 B1 *   7/2017  Alfishawi ............. H04L 65/602
10,699,321 B2 *  6/2020  Krishnamurthy ... G06F 16/9535
(Continued)

OTHER PUBLICATIONS

Otebolaku, Abayomi. "Context-Aware Personalization for Mobile Multimedia." May 2015. 257 pages. (Year: 2015).*
(Continued)

*Primary Examiner* — Kimberly L Wilson
(74) *Attorney, Agent, or Firm* — Morgan, Lewis & Bockius LLP (57) ABSTRACT

An electronic device stores a plurality of vector representations for respective media content items in a vector space, where each vector represents a media content item. The electronic device receives a first set of input parameters representing a previous session of a user of the media-providing service where the previous session included two or more of the respective media content items. The electronic device then receives a second set of input parameters representing a current context of the user and provides the first set of input parameters and the second set of input parameters to a neural network to generate a prediction vector for a current session. The prediction vector is embedded in the vector space. The electronic device identifies, based on the prediction vector for the current session, a plurality of media content items of the respective media content items in the vector space and provides the plurality of media content items to the user of the media-providing service during the current session.

20 Claims, 7 Drawing Sheets

(51) Int. Cl.
    *G06F 16/41* (2019.01)
    *H04L 65/60* (2022.01)
    *G06N 3/08* (2023.01)
    *G06F 16/2457* (2019.01)

(52) U.S. Cl.
    CPC ............. *G06F 16/438* (2019.01); *G06N 3/08* (2013.01); *H04L 65/60* (2013.01)

(58) Field of Classification Search
    USPC ....................................................... 707/722
    See application file for complete search history.

(56) References Cited

U.S. PATENT DOCUMENTS

2019/0197073 A1   6/2019   Liu et al.
2019/0212160 A1   7/2019   Kennedy et al.

OTHER PUBLICATIONS

Alex Beutel et al., "Latent Cross: Making Use of Context in Recurrent Recommender Systems," Technical Presentation, WSDM'18, Feb. 5-9, 2018, Marina Del Rev, CA, USA, 9 pgs.

Andreu Vall, Matthias Dorfer, Markus Schedl, and Gerhard Widmer, 2018, A hy-brid approach to music playlist continuation based on playlist-song membership, In Proceedings of the 33rd Annual ACM Symposium on Applied Computing, Apr. 9-13, 2018, Pau, France, ACM, 1374-1382, 9 pgs.

Andrew Zimdars, David Maxwell Chickering, and Christopher Meek, 2001, Using Temporal Data for Making Recommendations, In Proceedings of the Seventeenth conference on Uncertainty in artificial intelligence, 2001, Morgan Kaufmann Publishers Inc., 580-588, 9 pgs.

Ashton Anderson, Ravi Kumar, Andrew Tomkins, and Sergei Vassilvitskii. 2014, The dynamics of repeat consumption. In Proceedings of the 23rd international conference on World Wide Web, WWW'14, Apr. 7-11, 2017, Seoul, Korea, ACM, 419-430, 11pgs.

Balázs Hidasi, Alexandros Karatzoglou, Linas Baltrunas, and Domonkos Tikk, 2016, Session-based recommendations with recurrent neural networks, published as a conference paper at ICLR 2016, arXiv:1511.06939v4 [cs.LG], Mar. 29, 2016, 10 pgs.

Balázs Hidasi, Alexandros Karatzoglou, Recurrent Neural Networks with Top-k Gains for Session-based Recommendations, CIKM '18, Oct. 22-26, 2018, Torino, Italy, arXiv: 1706.03847v3 [cs.LG] Aug. 28, 2018, 10 pgs.

Brian Brost, Rishabh Mehrotra, and Tristan Jehan, 2019, The Music Streaming Sessions Dataset, In The World Wide Web Conference (WWW '19), ACM, New York, NY, USA, 2594-2600, https://doi.org/10.1145/3308558.3313641, arXiv:1901.09851v1 [cs.IR] Dec. 31, 2018, 3 pgs.

Bruno L. Pereira et al., Online Learning to Rank for Sequential Music Recommendation, RecSys'19, Sep. 16-20, 2019, Copenhagen, Denmark, 9 pgs.

Chao-Ynan Wu, Amr Ahmed, Alex Beutel, Alexander J Smola, and How Jing. 2017, Recurrent recommender networks, In Proceedings of the tenth ACM international conference on web search and data mining, WSDM'17, Feb. 6-10, 2017, Cambridge, United Kingdom, ACM, 495-503, 9 pgs.

Ching-Wei Chen, Paul Lamere, Markus Schedl, and Hamed Zamani, 2018, Recsys Challenge 2018: Automatic Music Playlist Continuation, In Proceedings of the 12th ACM Conference on Recommender Systems (RecSys '18), ACM, New York, NY, USA, 527-528, 2 pgs., https://doi.org/10.1145/3240323.3240342.

Dawen Liang et al., Variational Autoencoders for Collaborative Filtering, In Proceedings of the 2018 Web Conference (WWW 2018), ACM, New York, NY USA, arXiv:1802.05814v1 [stat.ML] Feb. 16, 2018, 10 pgs.

Diederik P Kingma and Jimmy Ba, Adam: A method for stochastic optimization, Published as a conference paper at ICLR 2015, arXiv preprint arXiv:1412.6980v9 [cs.LG], Jan. 30, 2017, 15 pgs.

Diksha Garg, Priyanka Gupta, Pankaj Malhotra, Lovekesh Vig, and Gautam Shroff. 2019, Sequence and Time Aware Neighborhood for Session-based Recommendations: STAN. In Proceedings of the 42Nd International ACM SIGIR Conference on Research and Development in Information Retrieval (SIGIR'19), Jul. 21-25, 2019, Paris, France, ACM, New York, NY, USA, 1069-1072, 4 pgs., https://doi.org/10.1145/3331184.3331322.

Evgeny Frolov and Ivan Oseledets, Tensor methods and recommender systems, Wiley Interdisciplinary Reviews: Data Mining and Knowledge Discovery 7, 3 (2017), arXiv:1603.06038v2 [cs.LG] Feb. 18, 2018, 42 pgs.

Fei Sun, et al., BERT4Rec: Sequential Recommendation with Bidirectional Encoder Representations from Transformer, Woodstock'19, Jul. 2019, El Paso, Texas, USA, arXiv:1904.06690v1 [cs.IR], Apr. 14, 2019, 11 pgs.

Felipe Soares da Costa et al., Collective Embedding for Neural Context-Aware Recommender Systems, RecSys'19, Sep. 16-20, 2019, Copenhagen, Denmark, 9 pgs.

Guorui Zhou et al., Deep Interest Evolution Network for Click-Through Rate Prediction, Copyright © 2019, Association for the Advancement of Artificial Intelligence, arXiv:1809.03672v5 [stat.ML] Nov. 16, 2018, 9 pgs.

Guy Shani, David Heckerman, and Ronen I Brafman. 2005. An MDP-based recommender system. Journal of Machine Learning Research 6, Sep. 2005, 1265-1295, 31 pgs.

Hamed Zamani, Markus Schedl, Paul Lamere, and Ching-Wei Chen, 2018, An Analysis of Approaches Taken in the ACM RecSys Challenge 2018 for Automatic Music Playlist Continuation, arXiv preprint arXiv:1810.01520v2 [cs.IR] Aug. 31, 2019, 20 pgs.

Hanjun Dai, Yichen Wang, Rakshit Trivedi, and Le Song. 2016, Deep coevolu-tionary network: Embedding user and item features for recommendation, In Proceedings of ACM conference, Halifax, Canada, Aug. 2017, arXiv preprint arXiv: 1609.03675v4 [cs.LG] Feb. 28, 2017, 10 pgs.

Jiacheng Li, Time Interval Aware Self-Attention for Sequential Recommendation, In the Thirteenth ACM International Conferene on Web Search and Data Mining (WSDM'20), Feb. 3-7, 2020, Houston, TX, USA, ACM, New York, NY, USA, 9 pgs.

Jiaxuan You, Hierarchical Temporal Convolutional Networks for Dynamic Recommender Systems, WWW '19, May 13-17, 2019, San Francisco, CA, USA, arXiv:1904.04381v2 [ cs.SI] Apr. 10, 2019, 11 pgs.

Jun Chen, Chaokun Wang, and Jianmin Wang, 2015, Will you "Reconsume" the near past? Fast Prediction on short-term Reconsumption Behaviorsm, Proceedings of the Twenty-Ninth AAAI Conference on Artificial Intelligence, 7 pgs.

Khalid Haruna, Maizatul Akmar Ismail, Suhendroyono Suhendroyono, Dami-asih Damiasih, Adi Cilik Pierewan, Haruna Chiroma, and Tutut Herawan. 2017. Context-aware recommender system: a review of recent developmental process and future res, 25 pgs.

Manus Kaminskas, Francesco Ricci, and Markus Schedl. 2013., Location-aware music recommendation using auto-tagging and hybrid matching, In Proceedings of the 7th ACM conference on Recommender systems, RecSys '13, Hong Kong, China, ACM 978-1-4503-2409-0, 17-24, 8 pgs.

Markus Schedl, Hamed Zamani, Ching-Wei Chen, Yashar Deldjoo, and Mehdi Elahi, 2018, Current challenges and visions in music recommender systems research, International Journal of Multimedia Information Retrieval 7, 2 (2018), published online Apr. 5, 2018, 95-116, 22 pgs.

Michael Gillhofer and Markus Schedl, 2015, Iron Maiden while jogging, Debussy for dinner?, An analysis of music listening behavior in context, In International Conference on Multimedia Modeling, Springer, 2015, 380-391, 12 pgs.

Michael J Pazzani and Daniel Billsus, 2007, Content-based recommendation systems, In The adaptive web. Springer, 325-341, 2007, 17 pgs.

Minsu Park, Jennifer Thom, Sarah Mennicken, Henriette Cramer, and Michael Macy, 2019, Global music streaming data reveal diurnal and seasonal patterns of affective preference, Nature Human Behaviour 3, 3 (2019), 230, 9 pgs.

(56) References Cited

OTHER PUBLICATIONS

Moshe Unger, Inferring Contextual Preferences Using Deep Auto-Encoding, UMAP '17, Jul. 9-12, 2017, Bratislava, Slovakia, UMAP 2017 Full Paper, 9 pgs.
Moshe Unger, Towards latent context-aware recommendation systems, Elsevier, Knowledge-Based Systems 104 (2016) 165-178, available online Apr. 27, 2016, 14 pgs.
Noveen Sachdeva, Sequential Variational Autoencoders for Collaborative Filtering, WSDM '19, Feb. 11-15, 2019, Melbourne, VIC, Australia, 9 pgs.
Pengjie Ren, Zhumin Chen, Jing Li, Zhaochun Ren, Jun Ma, and Maarten de Rijke, 2019, RepeatNet: A repeat aware neural recommendation machine for session-based recommendation. In Proceedings of the AAAI Conference on Artificial Intelligence, vol. 33. 4806-4813, 8 pgs.
Qingquan Song et al., Coupled Variational Recurrent Collaborative Filtering, Conference '17, Jul. 2017, Washington, DC, USA, 9 pgs.
Rakkappan, "Context-aware sequential recommendations with stacked recurrent neural networks," WWW '19, May 13-17, 2019, San Francisco, CA, USA, 7 pgs.
Rishabh Mehrotra, James McInerney, Hugues Bouchard, Mounia Lalmas, and Fernando Diaz, 2018, Towards a fair marketplace: Counterfactual evaluation of the trade-off between relevance, fairness & satisfaction in recommendation systems, In Proceedings of the 27th ACM International Conference on Information and Knowledge Management, CIKM '18, Oct. 22-26, 2018, Torino, Italy, ACM, 2243-2251, 9 pgs.
Sainbayar Sukhbaatar et al., End-to-End Memory Networks, Dept. of Computer Science, Courant Institute, New York University, 9 pgs.
Sepp Hochreiter and Jurgen Schmidhuber, 1997, Long short-term memoiy, Neural Computation 9, 8 (1997), 1735-1780, 32 pgs.
Shaina Raza and Chen Ding. 2019, Progress in context-aware recommender systems—An overview, Computer Science Review 31 (2019), 84-97, available online Feb. 1, 2019, 14 pgs.
Shangsong Liang, Dynamic Embeddings for User Profiling in Twitter, KDD '18, Aug. 19-23, 2018, London, United Kingdom, ACM, 10 pgs.
Shoujin Wang, Longbing Cao, and Yan Wang. 2019. A survey on session-based recommender systems. arXiv preprint arXiv:1902.04864v1 [cs.IR] Feb. 13, 2019, (2019), 34 pgs.
Shuai Zhang, Lina Yao, Aixin Sun, and Yi Tay, 2019, Deep Learning Based Recommender System: A Survey and New Perspectives, ACM Comput. Surv. 52, 1, Article 5 (Feb. 2019), https://doi.org/10.1145/3285029, arXiv: 1707.07435v7 [cs.IR], Jul. 10, 2019, 35 pgs.
Shuai Zhang, Yi Tay, Lina Yao, and Aixin Sun, 2018, Next Item Recommendation with Self-Attention, ArXiv abs/1808.064142 [cs.IR] Aug. 25, 2018, 10 pgs.
Srijan Kumar, Xikun Zhang, and Jure Leskovec, 2019, Predicting dynamic embedding trajectory in temporal interaction networks, In Proceedings of the 25th ACM SIGKDD International Conference on Knowledge Discovery & Data Mining, ACM, 1269-1278, 10 pgs.
Terry F Pettijohn, Greg M Williams, and Tiffany C Carter, 2010, Music for the seasons: seasonal music preferences in college students, Current Psychology 29, 4 (2010), 328-345, 18 pgs.
Ting Bai, Lixin Zou, Wayne Xin Zhao, Pan Du, Weidong Liu, Jian-Yun Nie, and Ji-Rong Wen. 2019. CTRec: A Long-Short Demands Evolution Model for Continuous-Time Recommendation. In Proceedings of the 42nd International ACM SIGIR Conference on Research and Development in Information Retrieval (SIGIR'19), Jul. 21-25, 2019, Paris, France, ACM, New York, NY, USA, 675-684, 10 pgs., https://doi.org/10.1145/3331184.3331199.
Tomas Mikolov, Kai Chen, Greg Corrado, and Jeffrey Dean, 2013, Efficient estimation of word representations in vector space, arXiv preprint arXiv:1301.3781v3 [cs.CL], Sep. 7, 2013, 12 pgs.
Toni Cebrián, Marc Planagumá, Paulo Villegas, and Xavier Amatriain. 2010. Music recommendations with temporal context awareness. In Proceedings of the fourth ACM conference on Recommender systems, ReeSys '10, Sep. 26-30, 2010, Barcelona, Spain, ACM, 349-352, 2 pgs.
Wang-Cheng Kang et al., Self-Attentive Sequential Recommendation, UC San Diego, arXiv: 1808.09781v1 [cs.IR] Aug. 20, 2018, 10 pgs.
Xiaopeng Li et al., Collaborative Variational Autoencoder for Recommender Systems, KDD '17, Aug. 13-17, 2017, Halifax, NS, Canada, 10 pgs.
Yehuda Koren, Robert Bell, and Chris Volinsky. 2009. Matrix Factorization Techniques for Recommender Systems. Computer, Published by the IEEE Computer Society, 8 (Aug. 2009), 30-37, 8 pgs.
Yoram Bachrach, Yehuda Finkelstein, Ran Gilad-Bachrach, Liran Katzir, Noam Koenigstein, Nir Nice, and Ulrich Paquet, 2014, Speeding up the xbox recommender system using a euclidean transformation for inner-product spaces, In Proceedings of the 8th ACM Conference on Recommender systems, ACM, 257-264, 8 pgs.
Young Jun Ko, Lucas Maystre, and Matthias Grossglauser. 2016, Collaborative Recurrent Neural Networks for Dynamic Recommender Systems, In Proceedings of ACML 2016, vol. 63, 16 pgs.
Yu Zhu, Hao Li, Yikang Liao, Beidou Wang, Ziyu Guan, Haifeng Liu, and Deng Cai. 2017, What to Do Next: Modeling User Behaviors by Time-LSTM, In Proceedings of the Twenty-Sixth International Joint Conference on Artificial Intelligence, (IJCAI-17),3602-3608, 7 pgs.
Yuyu Zhang, Hanjun Dai, Chang Xu, Jun Feng, Taifeng Wang, Jiang Bian, Bin Wang, and Tie-Yan Liu. 2014, Sequential click prediction for sponsored search with recurrent neural networks. In Proceedings of the Twenty-Eighth AAAI Conference on Artificial Intelligence, 7 pgs.

* cited by examiner

SYSTEMS AND METHODS FOR PROVIDING MEDIA RECOMMENDATIONS USING CONTEXTUAL AND SEQUENTIAL USER EMBEDDINGS

TECHNICAL FIELD

The disclosed embodiments relate generally to providing recommendations for media content items, and, in particular, to using a neural network to analyze contextual information to provide media recommendations to a user.

BACKGROUND

Access to electronic media, such as music and video content, has expanded dramatically over time. As a departure from physical media, media content providers stream media to electronic devices across wireless networks, improving the convenience with which users can digest and experience such content.

As it becomes easier for users to find content, media content providers can organize media content items and group related content items together in order to provide users with better recommendations. Media content providers use a combination of information about the media content items and information about the users in order to provide personalized content for users.

SUMMARY

There is a need for systems and methods for providing recommended media content to users. The goal of such systems and methods is to determine whether a user will like or dislike a specific media content item before the user consumes (or starts to consume) the media content item. This technical problem is further exacerbated by the flood of thousands of media content items that are available for consumption. Moreover, whether a person will likely or dislike a media content item may depend on the user's context and mood. For example, a person may enjoy listening to pop music while on the treadmill, but may prefer to listen to a news podcast while driving.

Some embodiments described herein offer a technical solution to these problems by generating a set of media-content items that the system predicts will be enjoyable to the user that are tailored to the user's current context. To do so, the systems and methods described herein generate an embedding for a given listening session of a given user. The embedding is a vector in a vector space in which media content items are represented. The embedding is calculated sequentially (e.g., by considering a user's previous listening sessions) using one or more contextual cues that may have changed since the user's previous listening session. Media content items for the listening session are chosen based on the embedding (e.g., based on proximity to the embedding). By generating and providing user-specific media-content items for consumption, users enjoy personalized recommendations that suit their purposes for the current session.

For example, if a user typically listens to podcasts on their morning commute to the office, the described systems and methods process contextual cues (e.g., time of day, day of the week, podcast preference) to provide a recommendation to the user at the beginning of the user's listening session (e.g., at the beginning of the user's morning commute).

To that end, in accordance with some embodiments, a method is performed at a first electronic device. The first electronic device has one or more processors and memory storing instructions for execution by the one or more processors. The method includes storing a plurality of respective vector representations for respective media content items in a vector space, each vector representing a media content item. The method includes receiving a first set of input parameters representing a previous session of a user of the media-providing service, where the previous session included two or more of the respective media content items. The method includes receiving a second set of input parameters representing a current context of the user and providing the first set of input parameters and the second set of input parameters to a neural network to generate a prediction vector for a current session, wherein the prediction vector is embedded in the vector space. The method further includes identifying, based on the prediction vector for the current session, a plurality of media content items of the respective media content items in the vector space and providing the plurality of media content items to the user of the media-providing service during the current session.

In accordance with some embodiments, an electronic device includes one or more processors and memory storing one or more programs configured to be executed by the one or more processors. The one or more programs include instructions for storing a plurality of respective vector representations for respective media content items in a vector space, where each vector represents a media content item. The one or more programs further include instructions for receiving a first set of input parameters representing a previous session of a user of the media-providing service where the previous session included two or more of the respective media content items. The one or more programs further include instructions for receiving a second set of input parameters representing a current context of the user. The one or more programs further include instructions for providing the first set of input parameters and the second set of input parameters to a neural network to generate a prediction vector for a current session where the prediction vector is embedded in the vector space. The one or more programs further include instructions for identifying a plurality of media content items of the respective media content items in the vector space based on the prediction vector for the current session and providing the plurality of media content items to the user of the media-providing service during the current session.

In accordance with some embodiments, a computer-readable storage medium has stored therein instructions that, when executed by an electronic device, cause the electronic device to store a plurality of respective vector representation for respective media content items in a vector space. The instructions further cause the device to receive a first set of input parameters representing a previous session of a user of the media-providing service where the previous session included two or more of the respective media content items. The instructions further cause the device to receive a second set of input parameters representing a current context of the user. The instructions further cause the device to provide the first set of input parameters and the second set of input parameters to a neural network to generate a prediction vector for a current session, where the prediction vector is embedded in the vector space. The instructions further cause the device to identify a plurality of media content items of the respective media content items in the vector space based on the prediction vector for the current session and providing the plurality of media content items to the user of the media-providing service during the current session.

As described herein, context or contextual cues include information such as the time of day, day of the week, season, weather, location, and/or the type of device being used by the user.

For example, vector representations for media content items are stored by an electronic device. Each vector representation represents a media content item (e.g., song, video, podcast). Such vector representations may be included in input parameters that represent a previous session of the user. For example, song A, song B, and song C were played the last time a user accessed a media-providing service. Each song has a respective vector representation that is used for vector analysis. An input parameter may include a vector representation for song A, song B, and song C. The system uses the vector representations as a first set of input parameters, and current context information as a second set of input parameters to generate and provide a prediction vector. The prediction vector includes vector representations of media content that is generated for the user.

Thus, systems are provided with improved methods for providing context based media-content recommendations to users of a media-providing service.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first set of parameters could be termed a second set of parameters, and, similarly, a second set of parameters could be termed a first set of parameters, without departing from the scope of the various described embodiments. The first set of parameters and the second set of parameters are both set of parameters, but they are not the same set of parameters.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
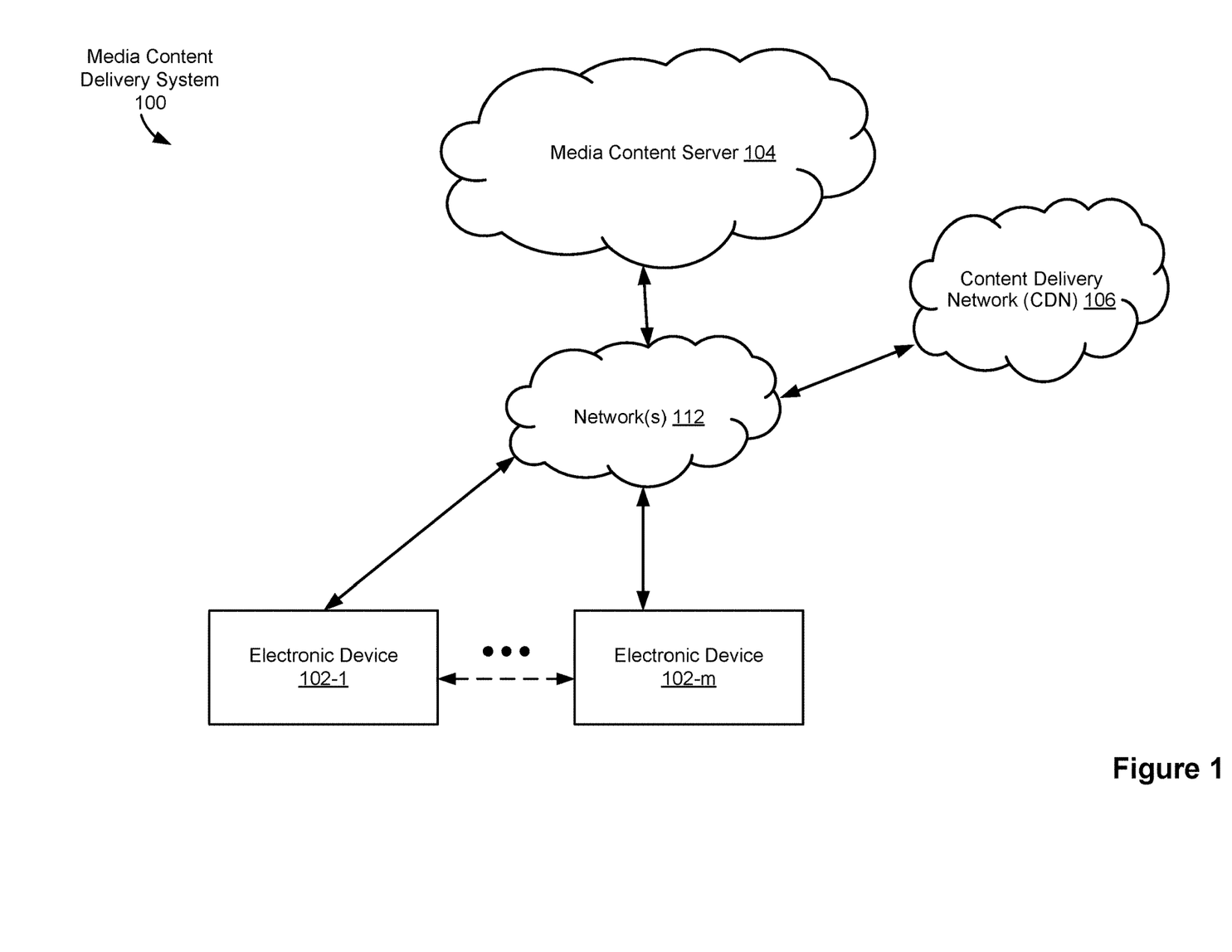
FIG. 1 is a block diagram illustrating a media content delivery system, in accordance with some embodiments.

FIG. 1 is a block diagram illustrating a media content delivery system 100, in accordance with some embodiments. The media content delivery system 100 includes one or more electronic devices 102 (e.g., electronic device 102-1 to electronic device 102-m, where m is an integer greater than one), one or more media content servers 104, and/or one or more content delivery networks (CDNs) 106. The one or more media content servers 104 are associated with (e.g., at least partially compose) a media-providing service. The one or more CDNs 106 store and/or provide one or more content items (e.g., to electronic devices 102). In some embodiments, the one or more CDNs 106 are associated with the media-providing service. In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, digital media player, a speaker, television (TV), digital versatile disk (DVD) player, and/or any other electronic device capable of presenting media content (e.g., controlling playback of media items, such as music tracks, videos, etc.). Electronic devices 102 may connect to each other wirelessly and/or through a wired connection (e.g., directly through an interface, such as an HDMI interface). In some embodiments, an electronic device 102 is a headless client. In some embodiments, electronic devices 102-1 and 102-*m* are the same type of device (e.g., electronic device 102-1 and electronic device 102-*m* are both speakers). Alternatively, electronic device 102-1 and electronic device 102-*m* include two or more different types of devices.

In some embodiments, electronic devices 102-1 and 102-*m* send and receive media-control information through network(s) 112. For example, electronic devices 102-1 and 102-*m* send media control requests (e.g., requests to play music, movies, videos, or other media items, or playlists thereof) to media content server 104 through network(s) 112. Additionally, electronic devices 102-1 and 102-*m*, in some embodiments, also send indications of media content items to media content server 104 through network(s) 112. In some embodiments, the media content items are uploaded to electronic devices 102-1 and 102-*m* before the electronic devices forward the media content items to media content server 104.

In some embodiments, electronic device 102-1 communicates directly with electronic device 102-*m* (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-*m*. In some embodiments, electronic device 102-1 communicates with electronic device 102-*m* through network(s) 112. In some embodiments, electronic device 102-1 uses the direct connection with electronic device 102-*m* to stream content (e.g., data for media items) for playback on the electronic device 102-*m*.

In some embodiments, electronic device 102-1 and/or electronic device 102-*m* include a media application 222 (FIG. 2) that allows a respective user of the respective electronic device to upload (e.g., to media content server 104), browse, request (e.g., for playback at the electronic device 102), and/or present media content (e.g., control playback of music tracks, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). In some embodiments, the electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, and/or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
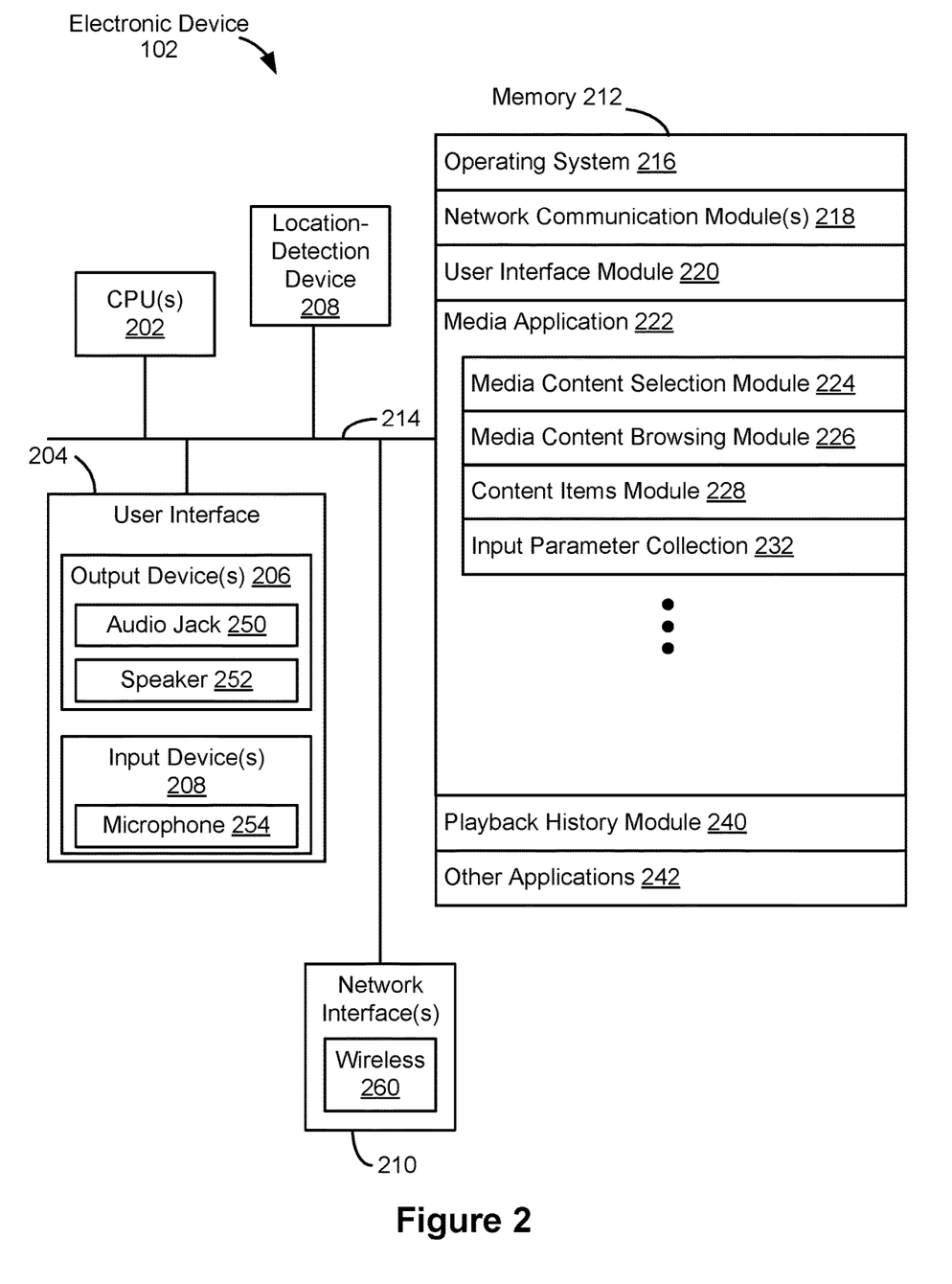
FIG. 2 is a block diagram illustrating a client device, in accordance with some embodiments.

FIG. 2 is a block diagram illustrating an electronic device 102 (e.g., electronic device 102-1 and/or electronic device 102-*m*, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include an audio jack 250 (or other physical output connection port) for connecting to speakers, earphones, headphones, or other external listening devices and/or speaker 252 (e.g., speakerphone device). Furthermore, some electronic devices 102 use a microphone and voice recognition device to supplement or replace the keyboard. Optionally, the electronic device 102 includes an audio input device (e.g., a microphone 254) to capture audio (e.g., speech from a user).

Optionally, the electronic device 102 includes a location-detection device 208, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, and/or or other wireless (e.g., Bluetooth-compatible) devices (e.g., for streaming audio data to the electronic device 102 of an automobile). Furthermore, in some embodiments, the wireless interface 260 (or a different communications interface of the one or more network interfaces 210) enables data communications with other WLAN-compatible devices (e.g., electronic device(s) 102) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:
- an operating system 216 that includes procedures for handling various basic system services and for performing hardware-dependent tasks;
- network communication module(s) 218 for connecting the electronic device 102 to other computing devices (e.g., other electronic device(s) 102, and/or media content server 104) via the one or more network interface(s) 210 (wired or wireless) connected to one or more network(s) 112;
- a user interface module 220 that receives commands and/or inputs from a user via the user interface 204 (e.g., from the input devices 208) and provides outputs for playback and/or display on the user interface 204 (e.g., the output devices 206);
- a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:
  - a media content selection module 224 for selecting one or more media content items and/or sending, to the media content server, an indication of the selected media content item(s);
  - a media content browsing module 226 for providing controls and/or user interfaces enabling a user to navigate, select for playback, and otherwise control or interact with media content, whether the media content is stored or played locally or remotely;
  - a content items module 228 for storing media items for playback at the electronic device;
  - an input parameter collection module 232 for collecting, storing and/or creating (e.g., curating) input parameter collections indicating a current context of the user (e.g., time of day, location, device);
- a playback history module 240 for storing (e.g., as a list for each user) media content items that have been presented (e.g., streamed) to a respective user and/or analyzing playback patterns for one or more users;
- other applications 242, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
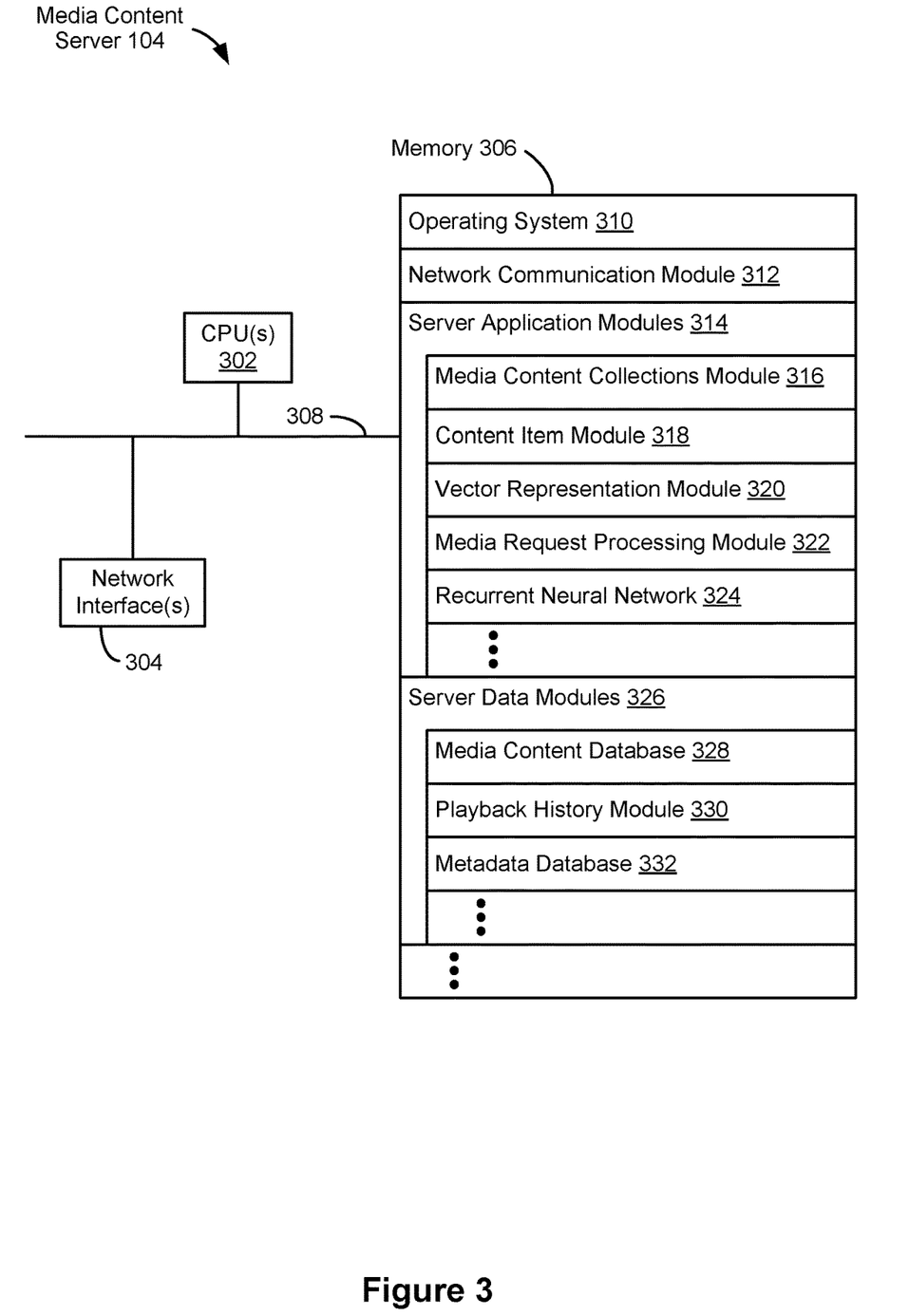
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:
- an operating system 310 that includes procedures for handling various basic system services and for performing hardware-dependent tasks;
- a network communication module 312 that is used for connecting the media content server 104 to other computing devices via one or more network interfaces 304 (wired or wireless) connected to one or more networks 112;
- one or more server application modules 314 for performing various functions with respect to providing and managing a content service, the server application modules 314 including, but not limited to, one or more of:

- a media content collections module 316 for storing and/or creating (e.g., curating) media content collections, each media content collection associated with one or more descriptor terms (e.g., playlist titles and/or descriptions) and/or including one or more media content items;
- a content item collection module 318 for collecting and storing media items for playback;
- a vector representation module 320 for determining and/or storing vector representations of content items in a vector space (e.g., song, podcast, video, see content item collections module 318);
- a media request processing module 322 for processing requests for media content and facilitating access to requested media items by electronic devices (e.g., the electronic device 102) including, optionally, streaming media content to such devices;
- a recurrent neural network module 324 for determining (e.g., analyzing) and providing one or more prediction vectors for listening sessions (e.g., embeddings in the vector space) based on vector representations of content consumed by users (among other things) and/or input parameters indicating a user's environment and/or current context;

one or more server data module(s) 326 for handling the storage of and/or access to media items and/or metadata relating to the media items; in some embodiments, the one or more server data module(s) 324 include:

- a media content database 328 for storing media content items;
- a playback history database 330 for storing (e.g., as a list for each user) media content items that have been consumed (e.g., streamed, listened, viewed) by a respective user; and
- a metadata database 332 for storing metadata relating to the media items.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above. In some embodiments, memory 212 stores one or more of the above identified modules described with regard to memory 306. In some embodiments, memory 306 stores one or more of the above identified modules described with regard to memory 212.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 328 and/or metadata database 330 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4:
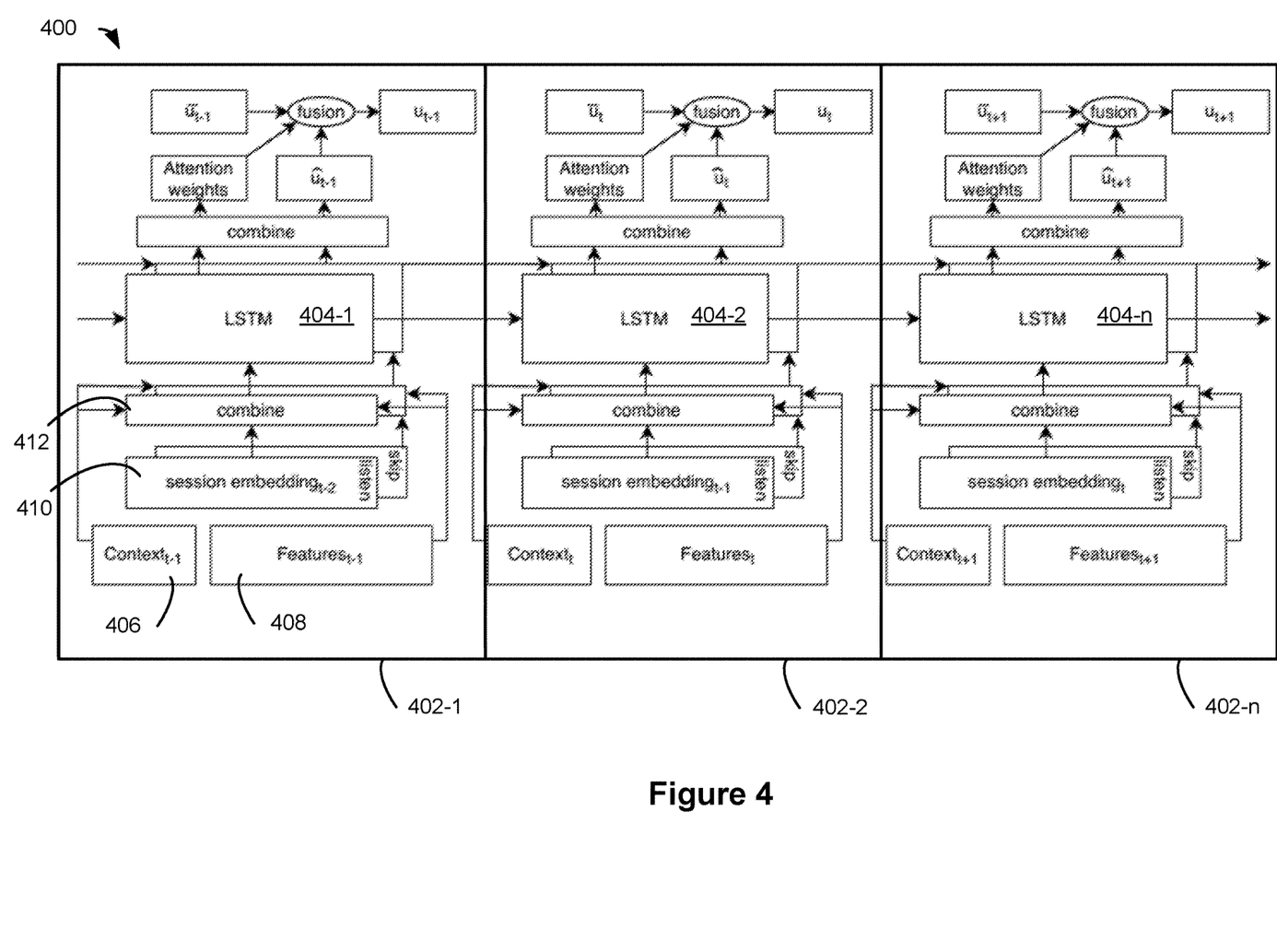
FIG. 4 is a block diagram illustrating an exemplary neural network for generating a prediction vector for a current session, in accordance with some embodiments.

FIG. 4 illustrates an exemplary neural network architecture (e.g., an architecture for a recurrent neural network model 400) for providing media recommendations using contextual and sequential user embeddings (e.g., prediction vectors for respective listening sessions of a respective user). Generally, recurrent neural networks (RNNs) include one or more "layers" that each have a one-way connection to every successive layer. Within recurrent neural network (RNN) model 400, a plurality of layers 402 are shown. Each layer 402 corresponds to a listening session and generates a prediction vector u that is used to provide media content items for the listening sessions. For example, $u_t$ represents the prediction vector for the $t^{th}$ listening session, $u_{t-1}$ represents the prediction vector for the previous listening session (i.e., prior to the $t^{th}$ listening session) and $u_{t+1}$ represents the prediction vector for the next listening session (i.e., after the $t^{th}$ listening session). As noted elsewhere, the prediction vector is an embedding in a same vector space (e.g., a 40-dimensional vector space of real numbers, i.e., $u_t \in \mathbb{R}^{40}$) that is used to represent media content items. Media content items for a respective listening session are selected, in some embodiments, based on proximity to the prediction vector for the respective listening session.

In some embodiments, the RNN model 400 generates the prediction vector for a current listening session by taking, as inputs, some or all of: information indicating whether (and which) media content items the user skipped or listened to in the previous session (session embedding 410), a context for the current listening session (e.g., values indicating time of day, day of the week, location, the device on which the listening session is to be provided, the weather, one or more biometric contexts such as heart rate, etc.); and a feature vector 408 that includes information about the previous session (which may include information indicating a number of media content items (e.g., tracks) consumed (e.g., listened to) in the previous session, an amount of time (e.g., in seconds) elapsed since the previous session, and a source of content from the previous session).

Moreover, long short-term memory (LSTM) may be used within the RNN model 400 described. LTSM is a machine learning system that has the ability to learn tasks that require memories of events. For example, in some embodiments, LTSM system 404 carried forward information (e.g., a latent input state) from one or more (or a plurality of) past sessions (e.g., capturing sequential dependencies in the user's consumption habits) and combines that information with the factors listed above (e.g., context 406, features 408, session embedding 410) using trained RNNs.

The RNN model 400 (or the respective RNNs or RNN layers within RNN model 400) may be trained, for example, using historical data by maximizing the similarity between historical prediction vectors $u_h$ and $s_h^+$, where is $s_h^+$ is an embedding in the same vector space in which the media content items are represented. The embedding $s_h^+$ represents the media content items that the user actually listened to (e.g., did not skip) during a historically-defined session indexed h (for future reference, $s_h^-$ is an embedding in the same vector space representing the media content items that the user skipped during the historically-defined session; and $s_h$ is an embedding in the same vector space representing all of the media content items from the historically-defined session). Note that the model is typically trained using data from a plurality of historically-defined sessions.

A more specific formalism will now be described. As a preliminary matter, a fully-connected neural network layer may be denoted:

$$FC_g(x)=g(Wx+b)$$

where x is the input layer, W is a weight matrix, b is a bias vector, and g is an activation function. In the various circumstances described below, g is sometimes the identity function (id), the ReLU function, or the softmax function. A composition of two functions $f$ and g evaluated at x (i.e., $f(g(x))$) is denoted $f \circ g(x)$.

In some embodiments, two input layers ($f_t^+$ and $f_t^-$) are generated.

$$f_t^+ = c_t \oplus s_{t-1}^+ \oplus [N_{t-1} z_{t-1} \Delta_t]$$

$$f_t^- = c_t \oplus s_{t-1}^- \oplus [N_{t-1} z_{t-1} \Delta_t]$$

where $c_t$ is a vector representing context variables for the current session (time of day, device, etc.), $s_{t-1}^+$ is an embedding representing the media content items that the user actually listened to during the previous session (e.g., $s_{t-1}^+$ is an average of all of the vector representations of the media items that the user listened to during the previous session), $s_{t-1}^-$ is an embedding representing the media content items that the user skipped during the previous session (e.g., an average of all of the vector representations of the media items that the user skipped during the previous listening session), $N_{t-1}$ is a number of tracks played in the previous session, $z_{t-1}$ is a source of the content from the previous session, and $\Delta_t$ is the time elapsed since the previous session.

In some embodiments, the input layers are transformed by applying a trained (learned) non-linear transformation that enables the RNN model 400 to better capture latent sequential dynamics. In some embodiments, the non-linear transformation corresponds to two fully connected layers (for each input layer, as represented by block 412 in FIG. 4) with ReLU activations, which can be denoted:

$$\hat{f}_t^+ = FC_{ReLU} \circ FC_{ReLU}(f_t^+)$$

$$\hat{f}_t^- = FC_{ReLU} \circ FC_{ReLU}(f_t^-)$$

Next, RNN model 400 captures and reuses relevant information from the user's history beyond the last session (e.g., history from two or more distinct sessions prior to the current session). To do so, RNN model 400 uses an RNN with LSTM, defined by:

$$(o_t^+, h_t^+) = LSTM(\hat{f}_t^+ | o_{t-1}^+, h_{t-1}^+)$$

$$(o_t^-, h_t^-) = LSTM(\hat{f}_t^- | o_{t-1}^-, h_{t-1}^-)$$

where $o_t^\pm$ is an output and $h_t^\pm$ is a hidden state. The outputs $o_t^+$ and $o_t^-$ are combined by a trained (learned) function to produce $o_t$ and $\hat{u}_t$, as defined below:

$$o_t = FC_{ReLU} \circ FC_{ReLU}(o_t^- \oplus o_t^+)$$

$$\hat{u}_t = FC_{id}(o_t)$$

In some embodiments, RNN model 400 reacts to (e.g., learns) session-specific deviations from a long-term user embedding $\bar{u}_t$, defined as a weighted average of all previous session embeddings s:

$$\bar{u}_t \propto \sum_{t'=1}^{t-1} \frac{t'}{t-1} s_{t'}$$

normalized such that $\|\bar{u}_t\|=1$. In some embodiments, $\hat{u}_t$ and $\bar{u}_t$ are fused by learning attention weights based on the RNN output $o_t$, such that uncertain RNN estimates can default to the long-term embedding. To that end, in some embodiments, the attention weights are calculated as:

$$[\hat{\beta}_t, \bar{\beta}_t] = FC_{softmax}(o_t)$$

In some embodiments, these weights are used to produce the prediction vector (embedding) for the current session $u_t$ as follows:

$$u_t = \hat{\beta}_t \hat{u}_t + \bar{\beta}_t \bar{u}_t$$

The prediction vector $u_t$ is used to select and provide a plurality of media content items to the user, e.g., until a determination is made that the current session has ended (because of an elapsed time, a change in context, change in device, etc.), at which point the prediction vector is updated by repeating the process described above.

Figure 5A:
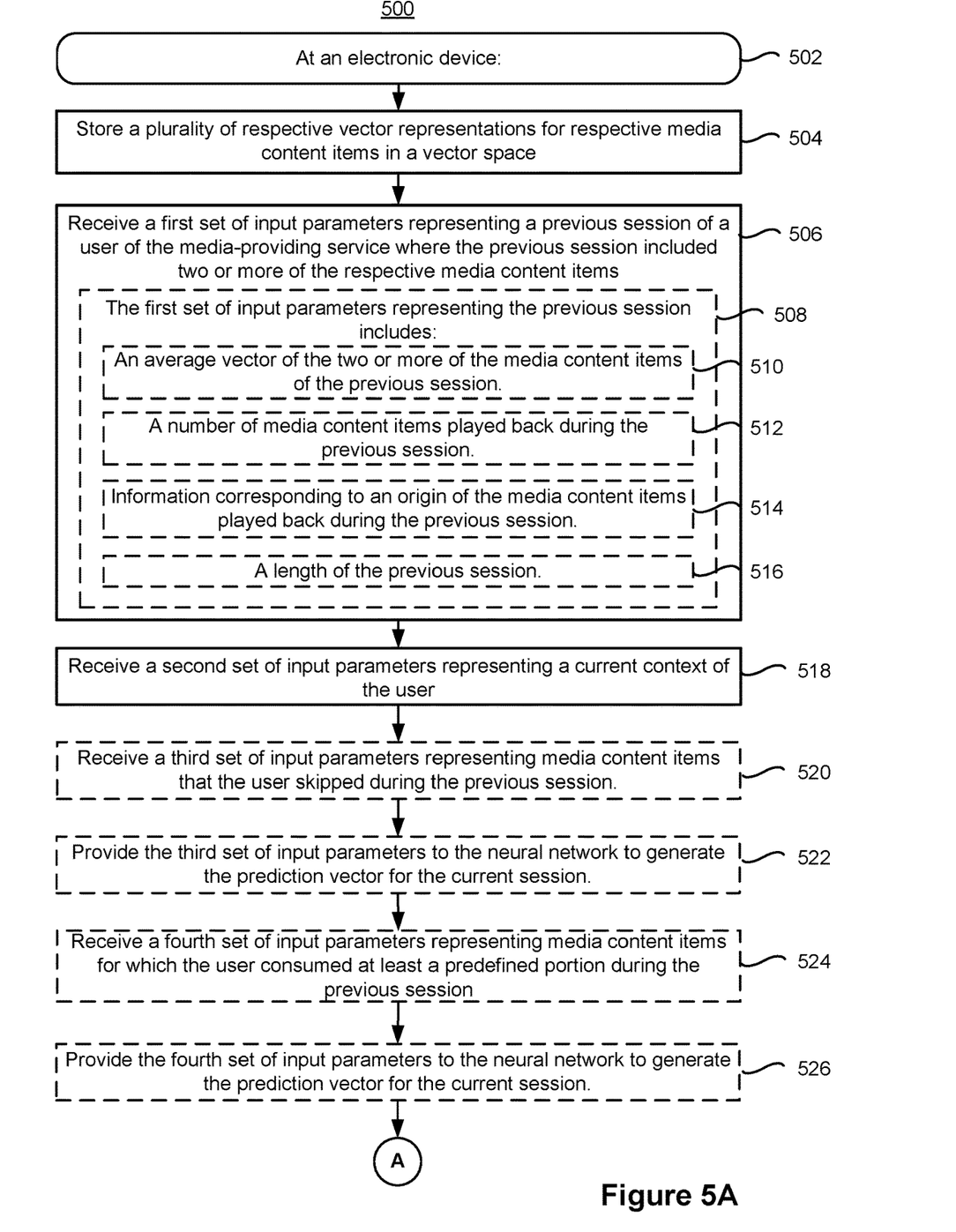
FIGS. 5A-5C are flow diagrams illustrating a method of generating a prediction vector for providing media recommendations based on contextual and sequential user embeddings, in accordance with some embodiments.
Figure 5B:
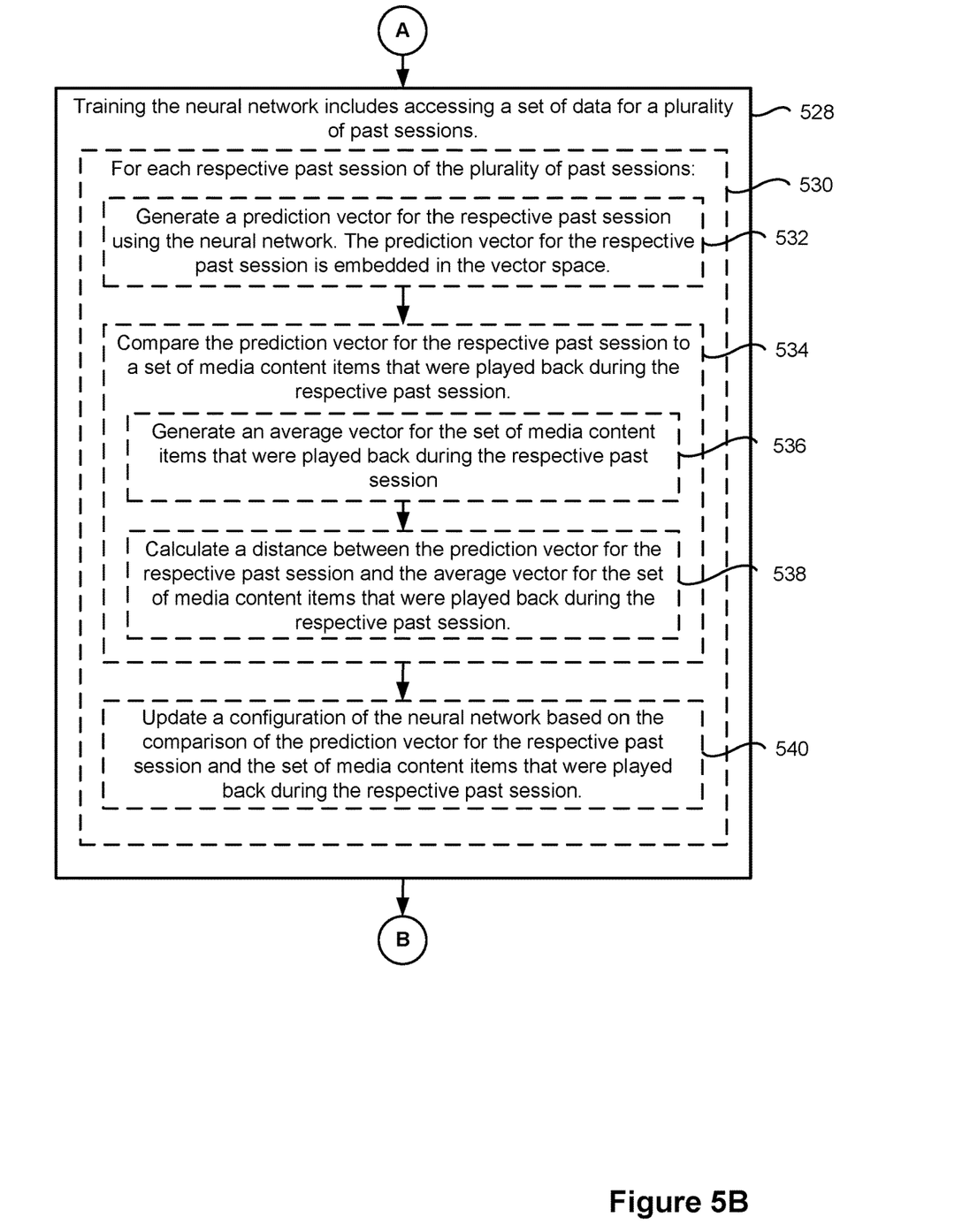
Figure 5C:
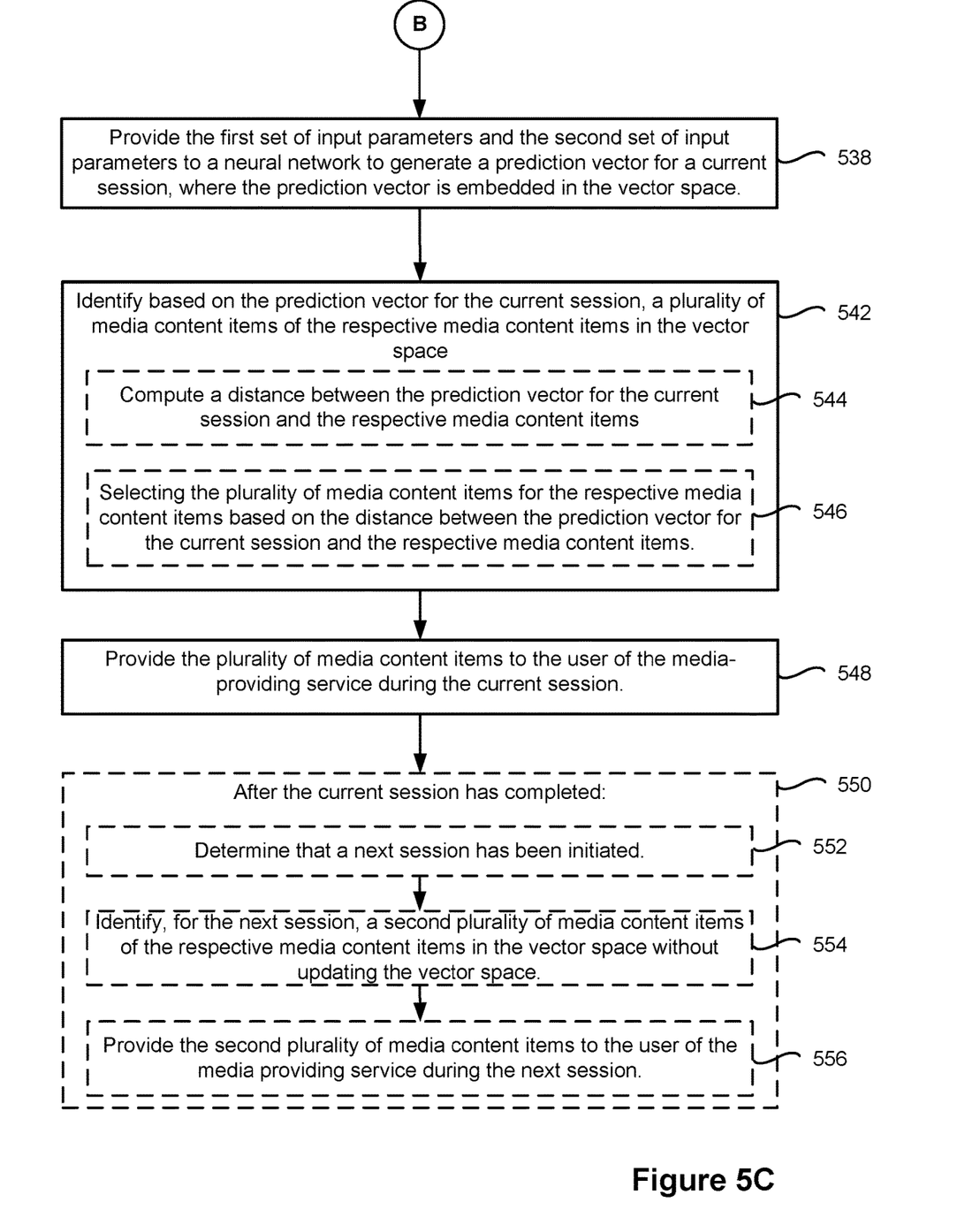

FIGS. 5A-5C are flow diagrams illustrating a method 500 for modifying a media content item, in accordance with some embodiments. Method 500 may be performed (502) at a first electronic device (e.g., media content server 104), the first electronic device having one or more processors and memory storing instructions for execution by the one or more processors. In some embodiments, the method 500 is performed by executing instructions stored in the memory (e.g., memory 212, FIG. 2) of the electronic device. In some embodiments, the method 500 is performed by an electronic device 102-1. In some embodiments, the method 500 is performed by a combination of the server system (e.g., including media content server 104 and/or CDN 106) and an electronic device (e.g., electronic device 102-1).

Referring now to FIG. 5A, in performing the method 500, an electronic device stores (504) a plurality of respective vector representations (e.g., stored in vector representation module 320) for respective media content items in a vector space. Each vector representation represents a media content item (e.g., stored in media content collections module 316, media application 222, and/or content items module 228).

The electronic device receives (506) a first set of input parameters (e.g., input parameter collection 232) representing a previous session of a user of the media-providing service where the previous session included two or more of the respective media content items. For example, the first set of input parameters is a feature vector or playback history (e.g., playback history module 240) representing the two or more media content items of the previous session. In another example, the first set of input parameters include "features" of the previous session (e.g., a number of media content items streamed, a location from where media content came from (a playlist curated by the media-providing service, a playlist curated by a user, etc.), a length of time of the previous session). In yet another example, the first set of input parameters include vector representations of all of the consumed content within the playback history of the previous session.

In some embodiments, a new session begins after ceasing playback for a threshold amount of time (e.g., after 10 minutes, 30 minutes of inactivity, the next content item provided to the user corresponds to the beginning of a new session (e.g., new playlist)). In some embodiments, a new session begins when the context changes. For example, a user is listening to music while at the gym. A new session is created when the user leaves the gym to drive back to her home.

In some embodiments, a new session is defined whenever the user requests playback of a media content item after one or more session-ending criteria have been met for the previous session (e.g., when any of a plurality of session-ending criteria have been met). For example, the session-ending criteria includes a criterion that is met when a playback is idle for a predefined amount of time. In some embodiments, the session-ending criteria include a criterion that is met when the current context of the user changes (e.g., the time changes from morning to afternoon, or the user uses a different device to access the media-providing service, or the user's location changes by more than a predefined amount). In some embodiments, the session-ending criteria include a criterion that is met when the user selects content from a different origin (e.g., changes radio stations, changes playlists).

In some embodiments, the first set of input parameters representing the previous session includes (508) an average vector of the two or more of the media content items of the previous session (510), a number (e.g., count) of media content items played back during the previous session (512), information corresponding to an origin of the media content items played back during the previous session (514), and/or a length of the previous session (516). For example, a first set of input parameters includes an indication that the media content items from the previous session were selected based on a station, a user-defined playlist, a playlist generated by the media-providing service, etc. In another example, a first set of input parameters representing the previous session includes: features of the previous session, of which the number of media content items in the previous session, the length of the previous session, and the origin of the media content are examples.

The electronic device, receives (518) a second set of input parameters (e.g., from input parameter collection 232) representing a current context of the user. For example, the electronic device receives a set of parameters indicating that a user is currently at home listening on his mobile device. The current context can be information regarding a time, a location, a type of device being used (e.g., mobile phone, speaker, desktop, web, tablet, television), or any other suitable contextual information relating to media-content consumption.

In some embodiments, the electronic device receives (520) a third set of input parameters (e.g., from input parameter collection 232) representing media content items that the user skipped during the previous session. For example, the third set of input parameters represents a number of media content items that the user has skipped, replayed, and/or a number of media content items the user consumed out of the total number of media content items provided to the user in a previous session. In some embodiments, the electronic device provides (522) the third set of input parameters to the neural network to generate the prediction vector for the current session. In such cases, the prediction vector for the current session is further based on the third set of input parameters.

In some embodiments, the electronic device receives (524) a fourth set of input parameters representing media content items for which the user consumed at least a predefined portion during the previous session. In such cases, the prediction vector for the current session is further based on the fourth set of input parameters. For example, a fourth set of input parameters may include a prediction vector that was previously generated for a previous session. In some embodiments, the electronic device provides (526) the fourth set of input parameters to the neural network to generate the prediction vector for the current session. In some embodiments, the current prediction vector is used as an input in a next (e.g., future) session.

Continuing into FIG. 5B, the method further includes the electronic device training (528) the neural network (e.g., RNN model 400). Training the neural network includes accessing a set of data for a plurality of past sessions. For example, the electronic device can access historical data for the plurality of past sessions, where the historical data for each respective past session indicates which media content items were played back during the particular past session. In another example, the electronic device can use historical playback data from previous user sessions to generate prediction vectors for the historical playback data and compare the prediction vectors to the historical results (e.g., what the users actually listened to during the historical sessions). The model is deemed more accurate when the generated prediction vectors for the historical playback data match what the user selected to play back during the historical sessions.

In some embodiments, for each respective past (530) session of the plurality of past sessions, generate (532) a prediction vector (e.g., generating retrospectively) for the respective past session using the neural network. The prediction vector for the respective past session is embedded in the vector space. For example, a prediction vector is retrospectively generated by providing, to the neural network, a set of input parameters representing a session prior to the respective past session and a set input parameter representing the content of the user during the respective past session.

In some embodiments, for each respective past session, compare (534) the prediction vector for the respective past session to a set of media content items that were played back during the respective past session. In some embodiments, comparing the prediction vector includes generating (536) an average vector for the set of media content items that were played back during the respective past session. In some embodiments, the method 500 includes generating an error metric based on the comparison between the prediction vector and the set of media content items that were played back during the respective past session. In some embodiments, comparing the prediction vector includes calculating (538) a distance between the prediction vector for the respective past session and the average vector for the set of media content items that were played back during the respective past session. In some embodiments, for each respective past session, update (540) a configuration of the neural network (e.g., a set of weights and/or biases for the neural network) based on the comparison of the prediction vector for the respective past session and the set of media content items that were played back during the respective past session.

FIG. 5C continues method 500 at step B when the electronic device provides (538) the first set of input parameters and the second set of input parameters to a neural network to generate a prediction vector for a current session, where the prediction vector is embedded in the vector space. In some embodiments, the electronic device identifies (542)

a plurality of media content items of the respective media content items in the vector space based on the prediction vector for the current session. In some embodiments, the electronic device computes (544) a distance (e.g., a cosine distance in vector space) between the prediction vector for the current session and the respective media content items. In some embodiments, the electronic device selects (546) the plurality of media content items for the respective media content items based on the distance between the prediction vector for the current session and the respective media content items. For example, the electronic device selects media content items with the shortest distance from the prediction vector. In another example, the electronic device randomly selects media content items that are within a predefined distance of the prediction vector.

In some embodiments, the electronic device provides (548) the plurality of media content items to the user of the media-providing service during the current session. In some embodiments, the electronic device identifies and provides a plurality of additional media content items based on the same prediction vector. For example, for each session, the same prediction vector is used to identify a plurality of media content items that are close to the prediction vector in the vector space.

In some embodiments, steps 502-548 are repeated to generate a next session prediction vector and a respective media content item recommendation for a next session. In some embodiments, to generate the next session prediction vector, the stored plurality of respective vector representations for respective media content items in a vector space remains the same. For example, the vector space is not updated between sessions.

In some embodiments, after the current session has completed (550), determine (552) that a next session has been initiated, identify (554) for the next session, a second plurality of media content items of the respective media content items in the vector space without updating the vector space, and provide (556) the second plurality of media content items to the user of the media providing service during the next session. For example, from session-to-session, only the prediction vector changes; the representations of the media items in the vector space remain the same.

Although FIGS. 5A-5C illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
    at a first electronic device associated with a media-providing service, the first electronic device having one or more processors and memory storing instructions for execution by the one or more processors:
    storing a plurality of respective vector representations for respective media content items in a vector space;
    receiving a first set of input parameters representing a previous session of a user of the media-providing service, wherein the previous session included two or more of the respective media content items;
    receiving a second set of input parameters representing a current context of the user;
    providing the first set of input parameters and the second set of input parameters to a neural network to generate a prediction vector for a current session, wherein the prediction vector is embedded in the vector space;
    identifying, using the prediction vector for the current session, a plurality of media content items of the respective media content items in the vector space; and
    providing the plurality of media content items to the user of the media-providing service during the current session.

2. The method of claim 1, further comprising training the neural network, including:
    accessing a set of data for a plurality of past sessions;
    for each respective past session of the plurality of past sessions:
        generating a prediction vector for the respective past session using the neural network, wherein the prediction vector for the respective past session is embedded in the vector space;
        comparing the prediction vector for the respective past session to a set of media content items that were played back during the respective past session; and
        updating a configuration of the neural network based on the comparison of the prediction vector for the respective past session and the set of media content items that were played back during the respective past session.

3. The method of claim 2, wherein comparing the prediction vector for the respective past session to the set of media content items that were played back during the respective past session includes:
    generating an average vector for the set of media content items that were played back during the respective past session; and
    calculating a distance between the prediction vector for the respective past session and the average vector for the set of media content items that were played back during the respective past session.

4. The method of claim 1, wherein identifying the plurality of media content items includes:
    computing a distance between the prediction vector for the current session and the respective media content items; and
    selecting the plurality of media content items from the respective media content items based on the distance between the prediction vector for the current session and the respective media content items.

5. The method of claim 1, wherein the first set of input parameters representing the previous session includes an average vector of the two or more of the media content items of the previous session.

6. The method of claim 1, wherein the first set of input parameters representing the previous session includes a number of media content items played back during the previous session.

7. The method of claim 1, wherein the first set of input parameters representing the previous session includes information corresponding to an origin of the media content items played back during the previous session.

8. The method of claim 1, wherein the first set of input parameters representing the previous session includes a length of the previous session.

9. The method of claim 1, further including:
receiving a third set of input parameters representing media content items that the user skipped during the previous session; and
providing the third set of input parameters to the neural network to generate the prediction vector for the current session.

10. The method of claim 1, further including:
receiving a fourth set of input parameters representing media content items for which the user consumed at least a predefined portion during the previous session; and
providing the fourth set of input parameters to the neural network to generate the prediction vector for the current session.

11. The method of claim 1, further comprising:
after the current session has completed:
determining that a next session has been initiated;
identifying, for the next session, a second plurality of media content items of the respective media content items in the vector space without updating the vector space; and
providing the second plurality of media content items to the user of the media-providing service during the next session.

12. A first electronic device associated with a media-providing service comprising:
one or more processors; and
memory storing instructions for execution by the one or more processors, the instructions including instructions for:
storing a plurality of respective vector representations for respective media content items in a vector space;
receiving a first set of input parameters representing a previous session of a user of the media-providing service, wherein the previous session included two or more of the respective media content items;
receiving a second set of input parameters representing a current context of the user;
providing the first set of input parameters and the second set of input parameters to a neural network to generate a prediction vector for a current session, wherein the prediction vector is embedded in the vector space;
identifying, using the prediction vector for the current session, a plurality of media content items of the respective media content items in the vector space; and
providing the plurality of media content items to the user of the media-providing service during the current session.

13. The first electronic device of claim 12, wherein the instructions further include instructions for training the neural network, including:
accessing a set of data for a plurality of past sessions;
for each respective past session of the plurality of past sessions:
generating a prediction vector for the respective past session using the neural network, wherein the prediction vector for the respective past session is embedded in the vector space;
comparing the prediction vector for the respective past session to a set of media content items that were played back during the respective past session; and
updating a configuration of the neural network based on the comparison of the prediction vector for the respective past session and the set of media content items that were played back during the respective past session.

14. The first electronic device of claim 13, wherein comparing the prediction vector for the respective past session to the set of media content items that were played back during the respective past session includes:
generating an average vector for the set of media content items that were played back during the respective past session; and
calculating a distance between the prediction vector for the respective past session and the average vector for the set of media content items that were played back during the respective past session.

15. The first electronic device of claim 12, wherein identifying the plurality of media content items includes:
computing a distance between the prediction vector for the current session and the respective media content items; and
selecting the plurality of media content items from the respective media content items based on the distance between the prediction vector for the current session and the respective media content items.

16. The first electronic device of claim 12, wherein the first set of input parameters representing the previous session includes an average vector of the two or more of the media content items of the previous session.

17. The first electronic device of claim 12, wherein the first set of input parameters representing the previous session includes a number of media content items played back during the previous session.

18. The first electronic device of claim 12, wherein the first set of input parameters representing the previous session includes information corresponding to an origin of the media content items played back during the previous session.

19. The first electronic device of claim 12, wherein the first set of input parameters representing the previous session includes a length of the previous session.

20. A non-transitory computer-readable storage medium storing instructions, which when executed by an electronic device associated with a media-providing service, cause the electronic device to perform operations including:
storing a plurality of respective vector representations for respective media content items in a vector space;
receiving a first set of input parameters representing a previous session of a user of the media-providing service, wherein the previous session included two or more of the respective media content items;
receiving a second set of input parameters representing a current context of the user;
providing the first set of input parameters and the second set of input parameters to a neural network to generate a prediction vector for a current session, wherein the prediction vector is embedded in the vector space;
identifying, using the prediction vector for the current session, a plurality of media content items of the respective media content items in the vector space; and
providing the plurality of media content items to the user of the media-providing service during the current session.

* * * * *